United States Patent
Valley et al.

(10) Patent No.: US 7,409,160 B2
(45) Date of Patent: Aug. 5, 2008

(54) GLOBAL GATEWAY ARCHITECTURE FOR INTERCONNECTING REGIONAL SATELLITES INTO A COMMUNICATION NETWORK

(75) Inventors: George C. Valley, Los Angeles, CA (US); Stanislav I. Ionov, Calabasas, CA (US); Anthony S. Acampora, La Jolla, CA (US); Hossein H. Izadpanah, Newbury Park, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 469 days.

(21) Appl. No.: 10/894,950

(22) Filed: Jul. 19, 2004

(65) Prior Publication Data

US 2004/0264970 A1    Dec. 30, 2004

(51) Int. Cl.
  *H04B 10/00* (2006.01)
(52) U.S. Cl. .................. 398/121; 398/124; 398/125
(58) Field of Classification Search ................ 398/121, 398/124, 125, 208
  See application file for complete search history.

(56) References Cited

U.S. PATENT DOCUMENTS

| | | | |
|---|---|---|---|
| 4,545,075 A | 10/1985 | Miller et al. | |
| 4,928,317 A | 5/1990 | Franchini | |
| 5,119,225 A | 6/1992 | Grant et al. | |
| 5,218,467 A | 6/1993 | Ross et al. | |
| 5,394,489 A | 2/1995 | Koch | |
| 5,475,520 A | 12/1995 | Wissinger | |
| 5,552,920 A | 9/1996 | Glynn | |
| 5,661,582 A | 8/1997 | Kintis et al. | |
| 5,710,652 A * | 1/1998 | Bloom et al. | 398/129 |
| 5,870,216 A | 2/1999 | Brock et al. | |
| 5,884,142 A | 3/1999 | Wiedeman et al. | |
| 5,956,620 A | 9/1999 | Lazaris-Brunner et al. | |
| 6,002,916 A | 12/1999 | Lynch | |
| 6,032,041 A | 2/2000 | Wainfan et al. | |
| 6,043,776 A | 3/2000 | Chiba et al. | |
| 6,128,112 A * | 10/2000 | Harres | 398/38 |
| 6,160,994 A * | 12/2000 | Wiedeman | 455/12.1 |
| 6,208,625 B1 | 3/2001 | Zancho et al. | |
| 6,219,617 B1 | 4/2001 | Dreischer et al. | |
| 6,222,658 B1 | 4/2001 | Dishman et al. | |
| 6,226,493 B1 | 5/2001 | Leopold et al. | |
| 6,243,513 B1 | 6/2001 | Wade | |
| 6,257,526 B1 | 7/2001 | Taormina et al. | |
| 6,267,329 B1 | 7/2001 | Chethik | |
| 6,295,152 B1 * | 9/2001 | Wedding | 398/209 |
| 6,304,354 B2 | 10/2001 | Carlson | |

(Continued)

OTHER PUBLICATIONS

D. Grybos et al., "Technology for the Future Marketplace", IEE, 1998.*

(Continued)

*Primary Examiner*—Shi K Li

(57) ABSTRACT

A satellite constellation has a plurality of network satellites that form a network. A gateway satellite is disposed adjacent to the network. The gateway satellites receive an optical signal from the network and converts the signal to an electrical signal. The gateway satellite has a sorter and a reshaping circuit for reshaping the electrical signal to form a reshaped signal. The electrical signal is converted back to an optical signal corresponding to the reshaped signal. The optical signal corresponding to the reshaped signal has reduced noise in comparison to the input optical signal. The optical signal is then retransmitted to another satellite.

10 Claims, 1 Drawing Sheet

U.S. PATENT DOCUMENTS

| | | |
|---|---|---|
| 6,307,879 B1 | 10/2001 | Moriyama |
| 6,327,063 B1 | 12/2001 | Rockwell |
| 6,339,707 B1 | 1/2002 | Wainfan et al. |
| 6,366,761 B1 | 4/2002 | Montpetit |
| 6,477,153 B1 | 11/2002 | Leopold et al. |
| 6,545,787 B1 * | 4/2003 | Lenormand et al. ......... 398/121 |
| 6,816,682 B1 * | 11/2004 | Ionov et al. ................. 398/121 |
| 6,912,075 B1 | 6/2005 | Ionov et al. |

OTHER PUBLICATIONS

"Introduction to Mathematical Statistics", 4th Edition by Paul G. Hoel, 1971, John Wiley & Sons, p. 1.*

Pending U.S. Appl. No. 09/327,351, filed Jun. 5, 1999, Ionov et al.

D. Grybos, "Technology for the Future Marketplace", A Perspective on Ka and On-Board Processing Technology—1998, The Institution of Electrical Engineers—Printed and published by the IEE, Savoy Place, London WC2R, OBL, UK.

* cited by examiner

GLOBAL GATEWAY ARCHITECTURE FOR INTERCONNECTING REGIONAL SATELLITES INTO A COMMUNICATION NETWORK

TECHNICAL FIELD

The present invention relates to space and communications satellites, and more particularly, to a communication system to interconnect satellites.

BACKGROUND ART

Satellites in geostationary orbits (GSO's) have been widely preferred because of the economic advantages afforded by such orbits. In a geostationary orbit, a satellite traveling above the earth's equator, in the same direction as that in which the earth is rotating, and at the same angular velocity, appears stationary relative to a point on the earth. These satellites are always "in view" at all locations within their service areas, so their utilization efficiency is effectively one-hundred percent. Antennas on earth need be aimed at a GSO satellite only once; no tracking system is required.

Coordination between GSOs and with terrestrial services is facilitated by governmental allocation of designated "slots" angularly spaced according to service type.

Given the desirability of geostationary satellite orbits and the fact that there are only a finite number of available "slots" in the geostationary "belt," the latter capacity has been essentially saturated with satellites operating in desirable frequency bands up through the Ku-band (up to 18 GHz). As a result, the government has been auctioning the increasingly scarce remaining slots.

The bottleneck in ground-to-satellite communications may be overcome by increasing the number of RF beams on board of a single satellite, increasing the number of satellites, e.g. deploying those using low earth orbits (LEO's), medium earth orbits (MEO's), or by putting several satellites into a single GSO slot and by using higher frequencies, for example, the Ka band (up to approximately 40 GHz). This appears to be a limit on the number of RF antennas on board of a single satellite. At this point, 50-100 antennas. Growth to higher frequencies is limited by difficult problems in technology and propagation. Expansion in satellite applications requires exploitation of the spatial dimension (i.e., above and below the GSO belt). A host of proposed LEO and MEO systems exemplify this direction.

Therefore, the only remaining way for increasing the capacity of satellite communication systems is increasing the number of the satellites. In this approach, the satellites are interconnected into a network that serves a wide geographic area. Today, laser communication links are planned for inter-satellite communications. The advantage of optical intersatellite links over RF links derives from (i) reduced power consumption and (ii) considerably smaller size and weight of an optical telescope versus an RF antenna. As a result, a single satellite can house more communication links, thereby increasing the overall data-handling capacity.

Satellite communications systems employing multiple RF ground links and optical intersatellite links will use complicated switching electronics to route the ever increasing volumes of data traffic. Systems that are being developed include a router that acts as a high speed switch. All data whether optical or RF uplink or downlink signals are converted to the electrical domain and routed appropriately through the satellite. The high speed switching electronics are enlarged to accommodate the optical signals.

High speed switching electronics consume a significant amount of electric power which is always at a premium on board of satellites. Moreover, as the volume of data traffic transmitted by numerous RF and optical channels of a satellite increases, the electronic switch becomes the bottleneck that limits the overall network capacity.

Passive optical routing (which retains and redirects signals destined for further relaying to other satellites in optical domain without down conversion to electronic format) is an attractive way of unloading the on-board electronic switch. Such passive optical routing requires designated optical carriers for each pair of communicating satellites on any inter-satellite link. The benefits of passive optical routing include: i) increased network handling capacity due to unloading the electronic switch, ii) transparency to communication protocols, i.e., the intermediate satellites do not have to understand the nature of the signal in order to route it, iii) non-blocking connectivity, i.e., a data stream is not required to wait until a communication link is done with transmitting data to another satellite.

Unfortunately, optical routing may be limited by the number of optical carriers available in a network. As networks become large, a significant amount of optical carriers would be used if only one optical carrier frequency could be used for only one interconnection in the system. It would therefore be desirable to reduce the number of optical carriers by using a unique optical carrier for each overlapping network path. This allows non-overlapping paths to reuse the same optical carrier.

In a commonly assigned related application, it was suggested that grouping and regrouping of satellites in LEO or MEO orbits is desirable. However the prior application is localized over a particular landmass and therefore does not suggest a global coverage.

SUMMARY OF THE INVENTION

It would therefore be desirable to provide an efficient system that allows global communication between reconfigurable satellite networks to form a large interconnected system over predetermined landmasses without severe degradation.

In one aspect of the invention, a plurality of satellites flying over a landmass form a network. These active satellites use RF channels to communicate with ground stations and optical links for communicating between each other. Importantly, passive WDM optical routing is employed to unload the on-board switching electronics of the active satellites. Gateway satellites are deployed adjacent to active satellites. The gateway satellites receive optical signals from the network of active satellites. These signals represent global data traffic between different networks of active satellites. Gateway satellites are not engaged in ground communications. The on-board switching electronics, which is otherwise idle on gateway satellites, is used to reshape and reroute incoming signals and, perhaps, change their wavelength. This strategy allows the building of global inter-commercial activity with minimal number of optical carriers.

In one implementation, the gateway satellite has a sorter and a reshaping circuit for reshaping the electrical signal to form a reshaped signal and retransmitting an optical signal corresponding to the reshaped signal.

In a further aspect, a method of a method of satellite communications comprises the steps of receiving a plurality of optical signals from a network satellite; converting the optical signals into a plurality of electrical signal; reshaping at least a first electrical signal from the plurality of electrical signals;

reshaping the first electrical signal into a reshaped electrical signal; converting the reshaped electrical signal into a second optical signal; and transmitting the second optical signal to another satellite.

One advantage of the invention is that in the otherwise idle switching electronics of gateway satellites is used to reshape optical signals and, perhaps, change their wavelength. The reshaping on gateway satellites are used to reduce noise from the optical signals and thus nearly recover the original optical signal, whereas wavelength change allows to achieve global interconnectivity with minimal number of optical carriers. This type of system is suitable for large networks in which several hops may be required between satellites.

Other objects and features of the present invention will become apparent when viewed in light of the detailed description of the preferred embodiment when taken in conjunction with the attached drawings and appended claims.

BEST MODE(S) FOR CARRYING OUT THE INVENTION

Figure 1:
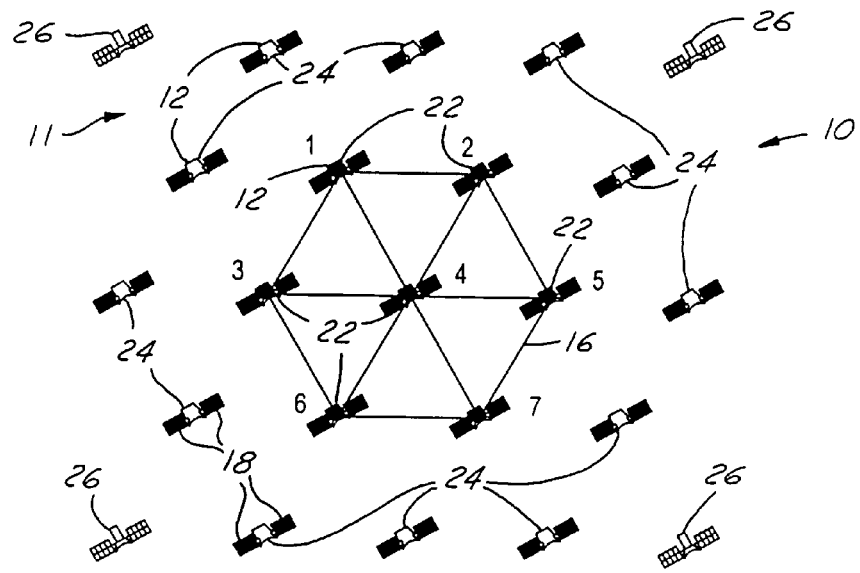
FIG. 1 is a view of a satellite network in the deployed configuration in which the present invention is applicable.

Referring now to FIG. 1, a communication system 10 includes satellite constellation 11 comprised of a plurality of satellites 12 orbiting the earth. Although not illustrated satellites 12 communicate with other satellites through an optical link and with ground stations (not shown) in a conventional manner. Satellites 12 may be in geosynchronous orbit (GSO), medium earth orbit (MEO) and low earth orbit (LEO) around earth. Although this invention may be used for other satellites in other types of orbits, this invention is particularly suitable for satellites in LEOs or MEOs. Due to the constant movement of the satellites, FIG. 1 is a snapshot of a portion of constellation 11.

Satellites 12 form a network 16. Network 16 is essentially a local area network (LAN) within the satellite constellation. Each satellite 12 receives and transmits radio frequency (RF) communications to earth by way of antennas 18. As will be further described below, each satellite 12 may communicate with an adjacent satellite in network 16 using optical signals. Because the satellites are spaced apart with respect to the earth and, if satellites 12 are in LEO or MEO, the relative position of satellites 12 with respect to the earth is changing. At any particular time, one or more satellites may be in view of the earth at a suitable elevation angle. The network 16 of satellites is preferably in view at a suitable elevation angle. As will be further described below, communications desired for a particular portion of the earth, such as a landmass, may be routed to one of the corresponding satellites 12 in the network in view at that particular time from the landmass.

RF communications from the ground enter network 16 through a communications node 30 on each satellite 12. Preferably, all communications between satellites occurs using an optical network. By using the optical network, the size, weight and power of the satellite payload is reduced and data handling capacity is increased.

Satellites 12 in constellation 11 may be grouped together in a subset 20 of active satellites 22. Active satellites are those that communicate with the ground. Active satellites 22 are shown in a hexagonal configuration with six outer satellites and one center satellite. However, a greater or fewer number of satellites may be included in the active configuration.

A plurality of gateway satellites 24 may be deployed around active satellites 22. Gateway satellites 24 may not be actively communicating with ground terminals due to their unfavorable locations, but may be used by active satellites 22 to communicate with other active subsets, i.e., local area networks, over other landmasses. Gateway satellites 24 may also be used to reshape noisy optical signals and change their wavelength as further described below.

Inactive satellites 26 are also illustrated. Inactive satellites 26 are not in use by constellation 11 at the moment of FIG. 1. However, due to the nature of the movement of MEOs and LEOs, satellites 12 may be reconfigured into a second subset that in appearance may be the same as FIG. 1 but with a different satellites. Network 16 may generally have the same relative position with respect to the landmass so that continuous coverage may be achieved. As satellites 12 move, their relative position will change with respect to the earth while maintaining network 16 in the same general location.

Figure 2:
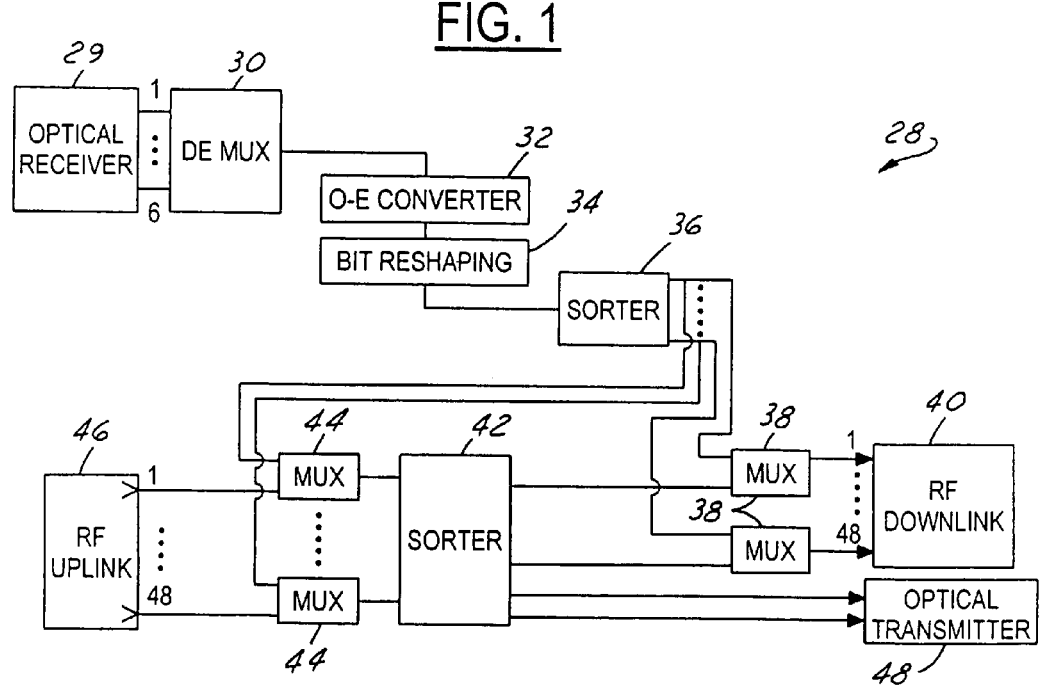
FIG. 2 is a schematic view of a circuit of a satellite used for reshaping an optical signal according to the present invention.

Referring now to FIG. 2, a portion of the circuitry for a node 28 is shown. The circuitry operates in a normal mode of operation similar to that of the related applications that are incorporated by reference herein and in a gateway mode. Normal mode is when the satellite is part of network 16. In normal mode, the satellite communicates with ground terminals and with other satellites in network 16. In gateway mode, the satellite is most likely over an ocean and is used for communications with other satellites. In gateway mode the benefits of the present invention are realized as is hereinafter described.

Node 28 has an optical receiver 29 and a multiplexer 30. Optical receiver 29 receives optical signals in a conventional manner such as by using a telescope and amplifying the optical signals in an amplifier. As shown, demultiplexer 30 has six inputs, corresponding to each receiving telescope. Demultiplexer 30 in normal operation decouples optical signals destined for transmission to the ground within its associated satellite. Other optical signals are passed through to an optical transmitter without conversion to an electrical signal (not shown). When a satellite merely passed on an optical signal, this is sometimes referred to as a hop. Each hop, however, adds optical noise to the signal. In gateway mode, the optical signals received by the gateway satellite are destined for reshaping and perhaps a wavelength changing on the gateway satellite. The optical signals, decoupled by the demultiplexer, as if they need to be transmitted to the ground, and are converted to electrical signals and reshaped.

Demultiplexer 30 is coupled to a an optical-to-electrical converter 32. Optical-to-electrical converter 32 may for example be an array of photodiodes that receive the optical signals and convert the optical signals to an electrical signal. In this example, the electrical signal is a digital signal representing a number of bits of the communications signal. A portion of the signal may be a header or other identification used to route the signal to its proper destination and for choosing the proper optical wavelength for communication.

Optical-to-electrical converter 32 is coupled to a bit reshaping circuit 34. Bit reshaping circuit 34 receives the electrical signal that has been converted from the optical signal. The optical signal if it has made enough hops is likely to have a signal to noise degradation. When the optical signal is converted to an electrical signal, the noise is manifested into electrical noise. In the present example, the noisy digital electrical signal may be converted to a reshaped signal using conventional digital signal processing. For example, a level detector may detect the level of the incoming signal and statistically determine the likelihood that the bit is a "0" or a "1".

Bit reshaping circuit 34 is coupled to a first sorter 36. First sorter 36, in a normal mode of operation, merely route the signals to a ground station through multiplexer 38 and RF downlink 40. The routing occurs using the header information from the received signal. In gateway mode, first sorter 36 is coupled to a second sorter 42 through a multiplexer 44. Multiplexers 44 and second sorter 42, in normal mode, are used to receive RF signal from uplink 46 and convert the received RF signals into electrical signals for either rerouting through the same satellite or routing to another satellite through optical transmitter. In the gateway mode, both first sorter 36 and second sorter 42 are coupled together so that the shaped signals may be routed to optical transmitter 48.

In operation, an optical signal from another satellite is received by the gateway satellite. The other satellite is most likely a network satellite 22 but may also be another gateway satellite 24. The optical signal received from the other satellite is received by optical receiver 29 in a conventional manner. If the signal is destined for reshaping in a conventional manner, the optical signal is converted to a corresponding electrical signal. The electrical signal is reshaped in bit reshaping circuit 34. Bit reshaping circuit 34 reshapes the electrical signal to reduce the amount of noise associated therewith. The noise is amplified and enhanced during hopping of the optical signal between satellites. Sorter 36 associated with optical receiver 29 couples the reshaped electrical signal to sorter 42, which is associated with the RF uplink 46. The reshaped electrical signal is coupled to optical transmitter 48 where the signal is converted from an electrical signal into an optical signal. This optical signal has reduced noise characteristics and, perhaps, a different wavelength from the signal received at optical receiver 29.

While particular embodiments of the invention have been shown and described, numerous variations and alternate embodiments will occur to those skilled in the art. Accordingly, it is intended that the invention be limited only in terms of the appended claims.

What is claimed is:

1. A method of communicating between satellites comprising the steps of:
   receiving an optical signal from a network satellite at a gateway satellite not part of the network;
   converting the optical signal into first electrical signal;
   reshaping said first electrical signal into a reshaped electrical signal;
   coupling the reshaped electrical signal to a first sorter;
   coupling the reshaped electrical signal to a second sorter;
   converting the reshaped electrical signal into a reshaped optical signal; and
   transmitting the reshaped optical signal from the gateway satellite to another satellite.

2. A method of communicating between satellites as recited in claim 1 further comprising the step of coupling the reshaped electrical signal to an optical transmitter.

3. A method of communicating between satellites as recited in claim 1 wherein the step of reshaping comprises the step of reshaping the first electrical signal into the reshaped electrical signal in a reshaping circuit.

4. A method of communicating between satellites as recited in claim 3 wherein the reshaping circuit comprises a level detector for statistically determining a "0" or "1" in spite of a noise level in the first electrical signal.

5. A method of communicating between satellites as recited in claim 1 wherein prior to the step of converting amplifying the first electrical signal.

6. A method of communicating between satellites as recited in claim 1 wherein the step of reshaping comprises the step of filtering noise from the first electrical signal.

7. A method of communicating between satellites as recited in claim 6 wherein the step of filtering noise comprises the step of digitally filtering the first electrical signal.

8. A method of communicating between satellites as recited in claim 1 wherein the step of converting the optical signal comprises converting the optical signal into a first digital electrical signal.

9. A satellite communication system comprising:
   a plurality of network satellites forming a network; and
   a gateway satellite disposed adjacent to and not part of the network, said gateway satellite receiving a first optical signal from said network and converting the signal to an electrical signal, said gateway satellite having a first sorter and a reshaping circuit for reshaping the electrical signal to form a reshaped electrical signal and retransmitting a second optical signal corresponding to said reshaped electrical signal, wherein said gateway satellite comprises
   an optical receiver for receiving a plurality of optical signals;
   an optical demultiplexer for resolving a first optical signal from said plurality of optical signals;
   an optical-to-electrical signal converter for converting the first optical signal of said plurality of optical signals to a first electrical signal;
   a reshaping circuit for reshaping said first electrical signal to a reshaped electrical signal;
   a first sorter coupled to said reshaping circuit, said first sorter routing said reshaped electrical signal from said plurality of electrical signals;
   a second sorter coupled to said first sorter, said first sorter routing said reshaped signal to said second sorter; and
   an optical transmitter coupled to said second sorter for receiving said reshaped electrical signal and converting said reshaped electrical signal to a reshaped optical signal.

10. A satellite communication system as recited in claim 9 wherein the shaping and resorting circuit comprises a level detector for statistically determining a "0" or "1" in spite of a noise level in the electrical signal.

* * * * *